United States Patent [19]
Wood et al.

[11] Patent Number: 5,096,210
[45] Date of Patent: Mar. 17, 1992

[54] DOUBLE FACE OVEN SEAL

[76] Inventors: Roy W. Wood, 119 Persimmon St., Birmingham, Ala. 35214; Alex Farris, 2134 Woodridge Dr., Birmingham, Ala. 35226; Danny R. Morrow, 3502 Fairoaks Dr., Jasper, Ala. 35501; D. O. Harden, 1830 Lake Ridge Rd., Birmingham, Ala. 35216

[21] Appl. No.: 612,476

[22] Filed: Nov. 14, 1990

[51] Int. Cl.⁵ .................. C10B 25/16; F16J 15/02; B65D 53/02
[52] U.S. Cl. ................... 277/229; 277/230; 277/191; 277/181; 277/189; 202/251; 202/269; 49/482; 49/493; 49/498
[58] Field of Search ............. 277/229, 230, 191, 181, 277/189, 183, 233; 202/251, 262, 263, 269; 49/482, 485, 493, 498

[56] References Cited
U.S. PATENT DOCUMENTS

| | | | |
|---|---|---|---|
| 1,665,377 | 4/1928 | Murphy | 277/191 |
| 2,924,471 | 2/1960 | Poltorak et al. | 277/230 |
| 3,020,185 | 2/1962 | Moffitt, Jr. et al. | 277/229 |
| 3,578,764 | 5/1971 | Nunnally et al. | 277/230 X |
| 3,682,339 | 8/1972 | Knappstein | 202/262 X |
| 3,716,150 | 2/1973 | Echterhoff et al. | 202/263 X |
| 4,224,767 | 9/1980 | Jecmen et al. | 49/498 X |
| 4,441,726 | 4/1984 | Uhl | 277/230 |
| 4,524,982 | 6/1985 | Hertz, Jr. | 277/229 |
| 4,740,271 | 4/1988 | Becker et al. | 202/269 X |
| 4,986,033 | 1/1991 | Weil | 277/181 X |

FOREIGN PATENT DOCUMENTS

| | | | |
|---|---|---|---|
| 3640299 | 6/1988 | Fed. Rep. of Germany | 202/269 |
| 3640396 | 6/1988 | Fed. Rep. of Germany | 202/269 |

*Primary Examiner*—William A. Cuchlinski, Jr.
*Assistant Examiner*—James K. Folker
*Attorney, Agent, or Firm*—John K. Donaghy

[57] ABSTRACT

A double face seal for coke ovens comprising charging and venting tubes having flanges; charging and venting ports having top surfaces; and sealing means attached to the flanges for engaging and sealing the top surfaces during charging and venting of coke ovens.

5 Claims, 3 Drawing Sheets

FIG. 6
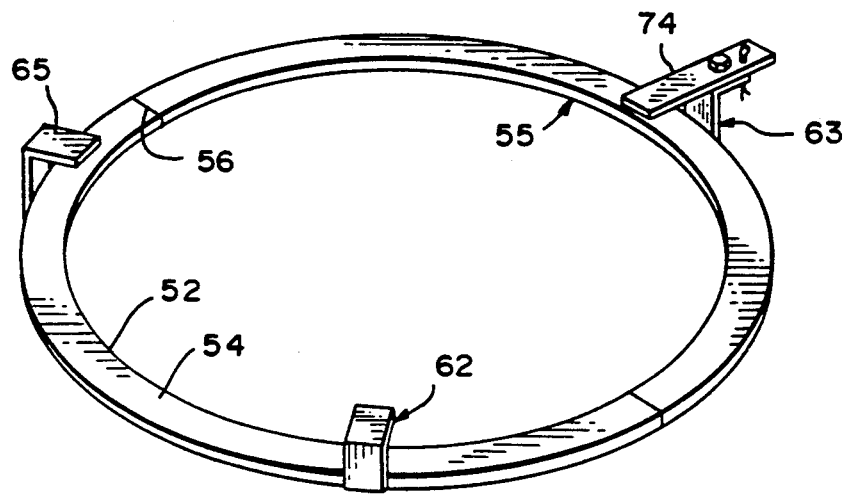
FIG. 7
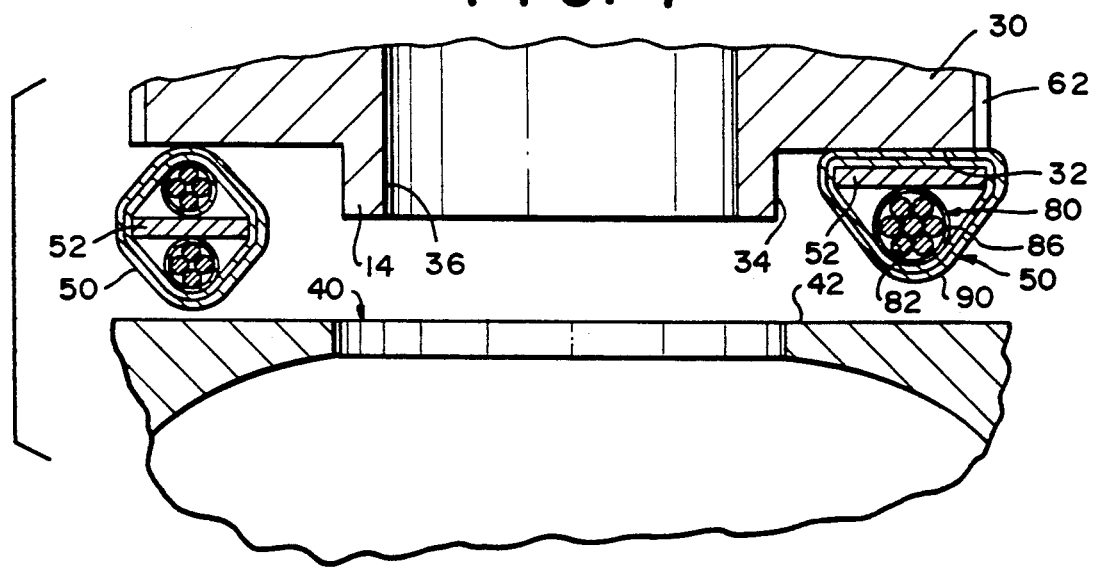
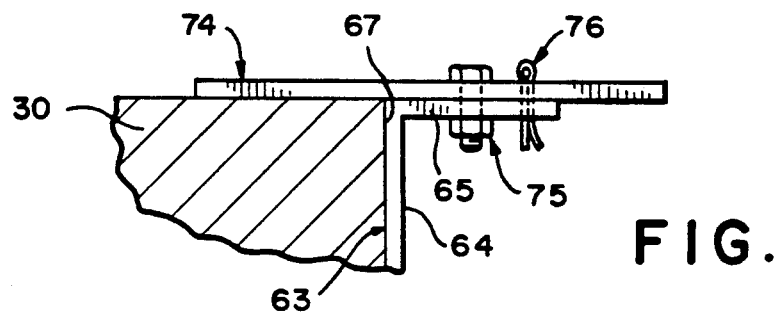
FIG. 8

DOUBLE FACE OVEN SEAL

BACKGROUND OF THE INVENTION

1. Field of the Invention

This invention pertains to pollution controls in the continuous coke producing industry.

2. Background of the Prior Art

The prior art discloses a series of coking ovens comprising a battery of ovens which operate continuously. On emptying an oven it is recharged by a charging car which runs on rails. The oven battery comprises a charging means to replenish the raw material (coal) and at the same time a means to capture the escaping gases and pollutants via a ducting system. These systems are controlled by the charging car operator by mechanically removing the oven-charging port seal and the gas and pollutant vent seal, and mechanically engaging the charging car charging and gas and pollutant systems to the oven. These charging and ducting systems are comprised of an aligning tube which extends onto the recessed area from which the sealing plugs were removed and covered by a flange around the extended tube which extends into the recessed ports of the oven. Due to the misalignment and eroded face of the coke oven ports, a complete seal cannot be achieved. Thus, gases, fire, smoke and other pollutants escape into the environment causing hazardous conditions.

Attempts have been made to attach various seals to charging and venting mechanisms with relatively little success due to the inability of maintaining the integrity of the seal as to mounting and support, and maintaining a continuous sealing surface.

This invention pertains to new and unique sealing means for the charging and ventilation tubes on charging cars used on continuous coke oven batteries.

SUMMARY OF THE INVENTION

There is, thus, a serious need for a pollution control device which will effectively seal the charging and venting ports of coke ovens during charging and emptying of same.

This invention provides for such a control device which is in the nature of a simple seal that is easy to install on existing coke oven charging and venting tubes associated with charging cars without the need for any special skills or tools.

It is a further object of this invention to provide a flexible sealing device between the metal flange of the charger and vent tubes and the metal masonry shoulder of the charging and vent ports of the oven.

And another object of this invention is to provide a flexible and compressible sealing mechanism capable of withstanding rough handling, high temperatures and flames associated with coke ovens.

It is yet another object of this invention to provide a sealing mechanism which is continuous and without open splices consisting of multiple layers of heat and fire-resistant materials combined to make a continuous flexible and compressible core.

It is still another object of this invention to provide a sealing mechanism in the nature of a ring having a solid base plate supporting a compressible medium of multiple layers of encased fiberglass material on both sides of the base plate.

BRIEF DESCRIPTION OF THE DRAWINGS

FIG. 6 is a perspective view of a base plate which supports the sealing mechanism.

FIG. 7 is a cross-section view of a coke oven with open port and sealing mechanism attached to a charger or venting tube.

FIG. 8 is a cross-section view of a locking device for securing the sealing mechanism to the charging tube flange.

DETAILED DESCRIPTION OF PREFERRED EMBODIMENT OF THE INVENTION

Figure 1:
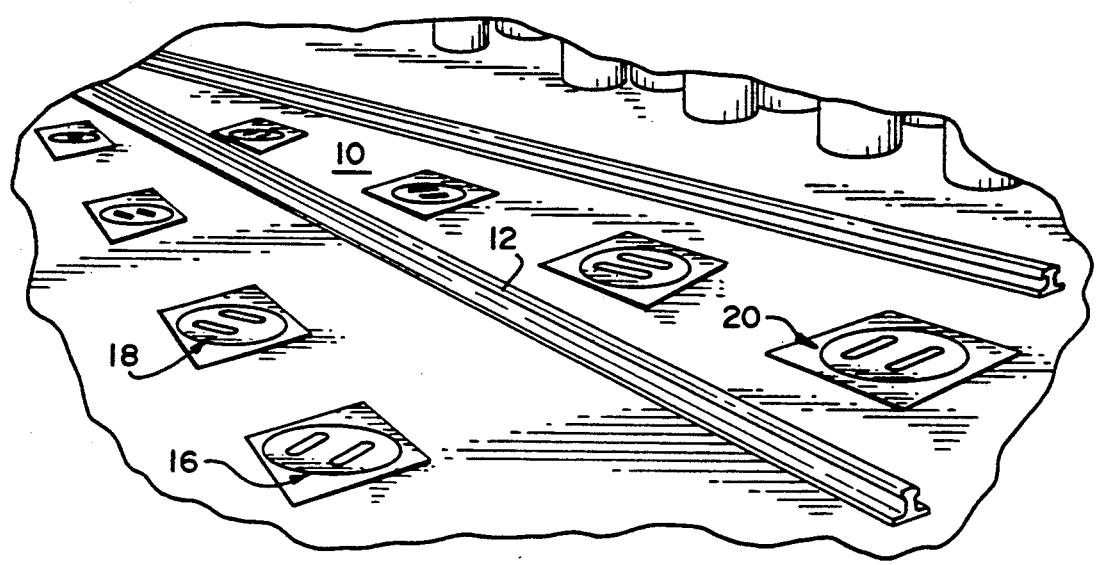
FIG. 1 is a perspective view of a battery of coke ovens having charging ports and vent ports accessible to material handling cars traversing on rails over the ovens.
Figure 2:
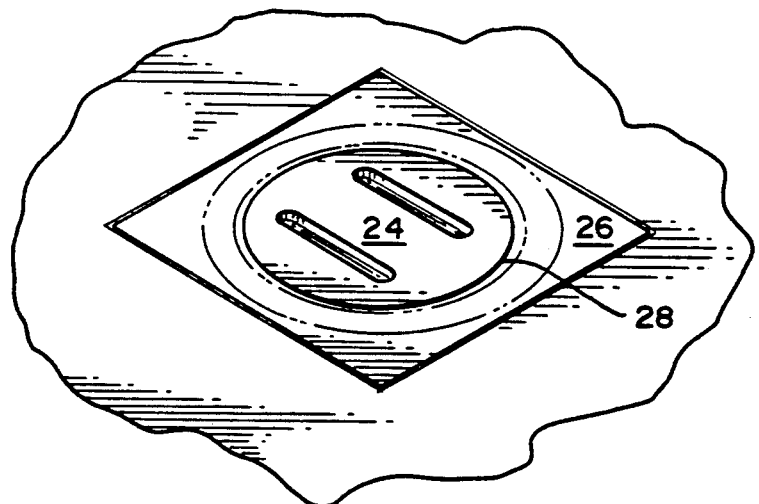
FIG. 2 is a close-up view of a charger or vent port with closure cap.
Figure 3:
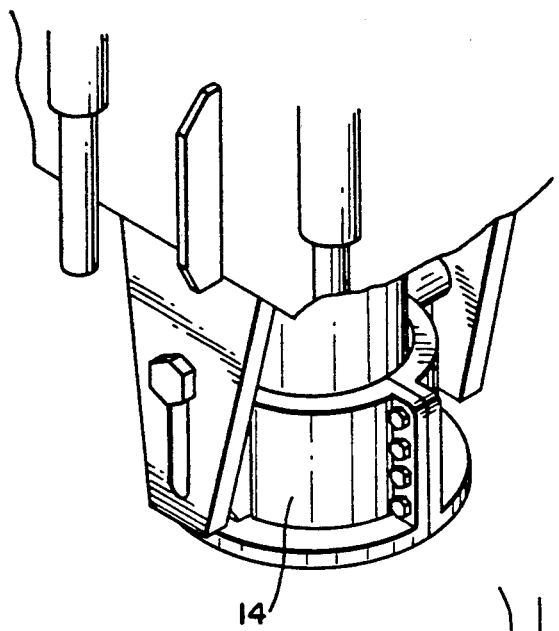
FIG. 3 is a perspective view of a charging tube with flange used on cars to charge the charging ports of coke ovens.
Figure 4:
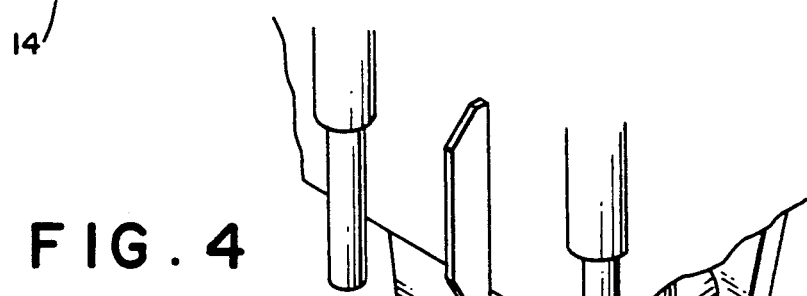
FIG. 4 is another perspective view of the charging tube with flange having a sealing ring attached thereto.

Referring now in more detail to the drawings, FIG. 1 shows a top view of a battery of coke ovens 10 over which material handling cars (not shown) travel on rails 12. The cars employ charging and venting tubes 14, FIGS. 3 and 4, which are used to charge and vent the oven charging ports 16, gas ports 18 and vent ports 20 which lie adjacent and between the rail 12. The charging ports 16, gas ports 18 and vent ports 20 are sealed with solid caps 24, FIG. 2. The surface areas 26 adjacent the openings 28 of the ports are rough and uneven as shown. This is due to the accumulation of dust and dirt which becomes hardened over time and pitting as a result of use and temperature variations.

During charging of these coke ovens, it is necessary to remove the solid caps 24 to allow the placement of charging tubes and venting tube 14 against the open ports 28. The charging and venting tubes comprise a tube 14 (not shown) having a bottom flange 30, FIGS. 4 and 7. The flange 30 of these tubes 14 has a flat bottom surface 32 and a vertical wall 34 on one side and a relatively flat surface 35 on the outside. It will be apparent that the nipple 36 of the tube 14 is inserted into the opening 40 of the oven port whereby the bottom surface 32 of flange 30 rests on the top surface 42 of the oven.

During charging and venting of the ovens through these ports 16-20, a tight seal between the bottom surface 32 of flange 30 and the tops 42 of the ovens is not possible so that dust and gases escape into the environment thereby polluting the same. The sealing mechanism 50 of this invention is designed to eliminate the escape of these pollutants.

The sealing mechanism 50 comprises a base plate or ring 52 which has a flat top 54 and a flat bottom 55. The base plate 52 is comprised of two or more sections sealed at one or more intersections 56. The base plate 52 has a plurality of angle brackets 62 secured thereon as shown. At least one or more locking devices 63 are secured to the base plate.

The locking device 63 comprises a vertical leg 64 secured to the outside periphery 67 of the base plate by welding, bolts or the like. The leg 64 has a horizontal leg portion 65, FIG. 8, having a plurality of holes therein. The leg portion 65 has a locking bar 74 rotatable on bolt/nut arrangement 75. The bar 74, as seen in FIG. 8, is locked in place by a retaining pin 76.

The seal 50, as best seen in FIG. 7, comprises a flexible and compressible mediun having a core 80 made up of multiple layers of elements 82 encased in sheathing 86. This core 80 of elements is flexible and compressible so as to effect a perfect seal between the flange surface 32 and oven surface 42.

The core 80, as shown, is secured to the base plate 52 by multiple layers 90 of fire-resistant, flexible tubing encasing the core 80 and base plate 52 as shown. It will be appreciated that the tubing may be made of close-knit or woven material. The completed sealing mechanism is flexible, compressible, seamless and fire-resistant, and effects a seal whereby pollutants do not escape into the environment.

The length of tubing 90 will be at least two times the circumference of the base plate 52 and core 80, and will encase base plate 52 and core 80 by wrapping continuously over itself.

The sealing mechanism 50 is attached to the flange 30 by the hook portion 65 of the brackets 62, FIG. 6. The seal assembly 50 is fastened to the flange 30 by locking the arm 74 over the flange 30, FIG. 8.

Figure 5:
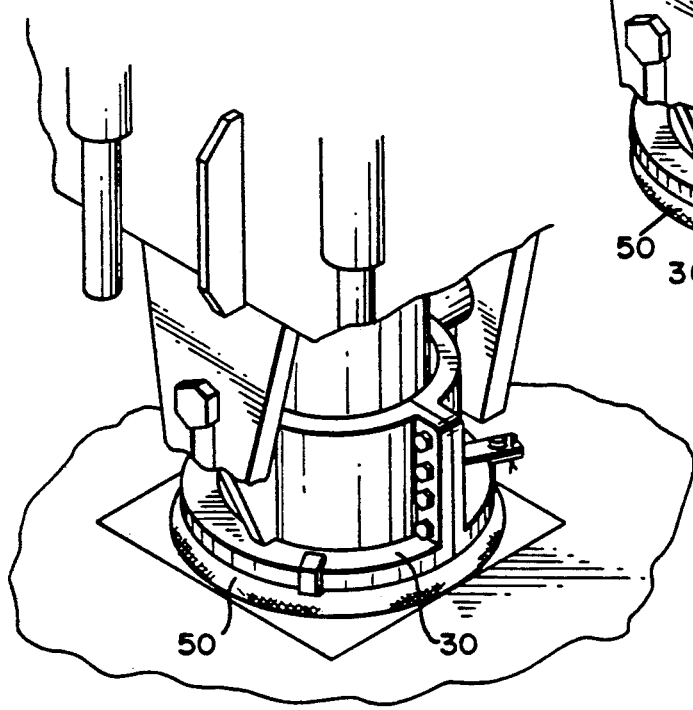
FIG. 5 is a close-up view of FIG. 4 showing the sealing ring attached to the charging tube flange.

The sealing mechanism 50, is seen secured to the flange 30 in FIG. 5. It will be understood that the sealing mechanism 50 comprising the core 80 is positioned on both top 54 and bottom 55 of the base plate 52 so that the core 80 is between the flange surface 32 as well as the oven surface 42. This provides a double-faced seal to ensure a complete and tight seal between the flange surface 32 and the oven surface 42.

In operation, when it is time to charge the ovens, cars having the tubes 14 roll on the rails 12 to positions adjacent the openings for the charging and venting ports. The port covers 24 are removed and the tubes 14, with the sealing mechanism 50 thereon are lowered over and seal the open ports by compressing the sealing mechanism 50 against the rough and pitted surface 26 of the ports and the charging tube flange surface 32 thus effecting a tight seal.

The charging commences in the usual manner and dust and pollutants are maintained inside the charging and venting tubes and are disposed of by apparatus normally used for these purposes.

While the invention has been described with respect to a preferred embodiment thereof, it will be apparent to those skilled in the art to which the invention pertains that numerous changes may be made in the invention without departing from the spirit and scope thereof.

What is claimed is:

1. A double face seal for coke ovens having charging and venting ports with irregular surfaces and associated charging and venting tubes having flanges with flat surfaces comprising:

a support base plate having a top side and a bottom side;

a first core of compressible material on said top side;

a second core of compressible material separate from said first core, located on said bottom side;

a flexible tubing encasing said base plate and said cores; and means for removably attaching said seal to said flanges, whereby said seal seals said coke oven when said tubes are brought into contact with said ports during charging of said coke oven.

2. A double face seal for coke ovens according to claim 1, wherein:

said means comprises at least one bracket and one locking bar for removably attaching said seal to said flanges, said locking bar being swingable arm locked over said flanges.

3. A double face seal for coke ovens according to claim 1, wherein:

said support base plate comprises a continuous ring and said cores comprise a plurality of elongated elements encased in a sheathing, said cores are attached to said ring with multiple layers of flexible tubing encasing said support base plate and said cores.

4. A double face seal for coke ovens as defined in claim 3, and said elements are strands of heat and fire-resistant fiberglass and said sheathing is a flexible tubing of heat and fire-resistant materials.

5. A double face seal for coke ovens as defined in claim 4, and said tubing comprising woven materials.

* * * * *